United States Patent
Slupphaug et al.

(10) Patent No.: US 9,323,252 B2
(45) Date of Patent: Apr. 26, 2016

(54) METHOD AND A SYSTEM FOR ENHANCED FLOW LINE CONTROL

(75) Inventors: Olav Slupphaug, Oslo (NO); Dag Kristiansen, Oslo (NO); Bjørn Bjune, Oslo (NO); Veslemøy Kristiansen, Oslo (NO)

(73) Assignee: ABB RESEARCH LTD., Zurich (CH)

( * ) Notice: Subject to any disclaimer, the term of this patent is extended or adjusted under 35 U.S.C. 154(b) by 1492 days.

(21) Appl. No.: 11/920,267

(22) PCT Filed: May 9, 2006

(86) PCT No.: PCT/IB2006/001183
§ 371 (c)(1),
(2), (4) Date: Mar. 6, 2009

(87) PCT Pub. No.: WO2006/120537
PCT Pub. Date: Nov. 16, 2006

(65) Prior Publication Data
US 2009/0173390 A1 Jul. 9, 2009

(30) Foreign Application Priority Data
May 10, 2005 (NO) .................................. 20052273

(51) Int. Cl.
*G05D 7/03* (2006.01)
*F16K 31/12* (2006.01)
(Continued)

(52) U.S. Cl.
CPC .............. *G05D 7/0635* (2013.01); *E21B 43/12* (2013.01); *Y10T 137/0379* (2015.04); *Y10T 137/7759* (2015.04)

(58) Field of Classification Search
CPC ..... G05D 7/0635; G05D 7/03; G05D 7/0106; G05D 7/06; G01F 1/6847; G01M 3/2807; F16K 31/12; E21B 43/12

USPC .......................................... 137/486, 487, 468
See application file for complete search history.

(56) References Cited

U.S. PATENT DOCUMENTS

| 5,014,789 A | 5/1991 | Clarke et al. |
| 5,256,171 A * | 10/1993 | Payne ................................ 95/19 |

(Continued)

FOREIGN PATENT DOCUMENTS

| NO | 319642 B1 | 8/2004 |
| WO | WO-02/46577 A1 | 6/2002 |

OTHER PUBLICATIONS

Havre et al.; Taming slug flow in pilelines; ABB Review; Apr. 2000; pp. 55-63.

(Continued)

*Primary Examiner* — Arthur O Hall
*Assistant Examiner* — Chee-Chong Lee
(74) *Attorney, Agent, or Firm* — Whitmyer IP Group LLC

(57) ABSTRACT

A method for automatically controlling a flow in a flow line system including a flow line, a flow line inlet and outlet, and a control valve located in the flow line at the outlet. The method includes controlling the opening of the valve with a control unit. An outlet flow rate is measured or estimated from the flow line. The valve is opened. It is determined if a sudden drop occurs in any of the measurements or estimates. It is decided if a liquid blockage in the flow line is present or approaching. If a liquid blockage is indicated as present or approaching, the opening of the valve is increased by an amount determined by the measurements or estimates. Any further manipulation of the valve is inhibited before a non-zero time period has expired. The steps are repeated. Also a system and a computer program product.

9 Claims, 10 Drawing Sheets

(51) Int. Cl.
*G05D 7/06* (2006.01)
*E21B 43/12* (2006.01)

(56) References Cited

U.S. PATENT DOCUMENTS

| | | | | |
|---|---|---|---|---|
| 5,494,067 | A * | 2/1996 | Levallois | 137/154 |
| 5,544,672 | A * | 8/1996 | Payne et al. | 137/1 |
| 6,041,803 | A * | 3/2000 | De Almeida et al. | 137/14 |
| 6,276,385 | B1 | 8/2001 | Gassman | |
| 6,390,114 | B1 | 5/2002 | Haandrikman et al. | |
| 6,716,268 | B2 * | 4/2004 | Molyneux et al. | 95/22 |
| 7,464,762 | B2 * | 12/2008 | Duret et al. | 166/357 |
| 2006/0150749 | A1 | 7/2006 | Eken et al. | |
| 2006/0151167 | A1 * | 7/2006 | Aarvik et al. | 166/267 |

OTHER PUBLICATIONS

Jansen et al.; Made to Measure; New upstream control and optimization techniques increase return on investment; ABB Review; Mar. 2001; pp. 20-27.

International Search Report—Oct. 25, 2007.
Storkaas et al., Cascade control of unstable systems with application to stabilization of slug flow, presented at IFAC—symposium Adchem 2003.
Norwegian search report—Nov. 14, 2005.
International preliminary report on patentability—Oct. 25, 2007.
Havre, et al.; "Active Feedback Control as the Solution to Severe Slugging"; SPE Annual Technical Conference and Exhibition; Sep. 30, 2001; pp. 1-16.
European Search Report Application No. EP 06 74 4663 Completed: Jan. 10, 2014; Mailing Date: Jan. 22, 2014 11 pages.
S.I. Sagatun; "Riser Slugging: A Mathematical Model and the Practical Consequences"; SPE Production & Facilities vol. 19, No. 3; Aug. 31, 2004; pp. 168-175.
Skofteland G, et al.; "Suppression of Slugs in Multiphase Flow Lines by Active Use of Topside Choke—Field Experience and Experimental Results"; International Journal of Multiphase Flow; Jun. 11, 2003, pp. 527-542.

* cited by examiner

2) Observation of Ba influence on pipeline/well
- Steady State Detection:
If |BaDpChoke2DerivativeFiltered|
< BaLim1_dDP_f_dt &
|BaP1DerivativeFiltered| <
BaLim1_dP1_f_dt & not
(BaStSt_detected = 1)
for BaT7_W seconds then
BaStSt_detected = 1
- System Stabilized Detection:
If BaDpChoke2DerivativeFiltered <
BaLim2_dDP_f_dt_pos
& BaDpChoke2DerivativeFiltered >
BaLim2_dDP_f_dt_neg
& BaP1DerivativeFiltered <
BaLim1_dP1_f_dt_pos
& BaP1DerivativeFiltered >
BaLim1_dP1_f_dt_neg
& not (BaSS_detected = 1)
for BaT6_W seconds then
BaSS_detected = 1

4) Enabling of "small" window action:
If BaDpChoke1 < BaLim1_DP then
  If BaSS_Detected = 1 then
    BaW_enable = 0
  else
    BaW_enable = 1
  end
end 5) Enabling of "large" window action:
If BaStSt_detected and both
BaBufferWindow and
BaLargeWindow are filled then
BaW2_enable=1

7) Checking if "small" window action is allowed:
If BaSmallWindow is filled
& BaW_enable = 1
& not ( BaWt_enable = 1)
then
"Small" window action is allowed 8) Checking if "large" window action is allowed:
If BaLargeWindow is filled
& BaW2_enable = 1
& not ( BaWt2_enable = 1)
then
"Large" window action is allowed 9) Checking if "large" window action is required:
If minimum (BaLargeWindow) -
BaDpChoke4 >

BaLim2_DP*minimum(BaLarge_Window)
then
"Large" window action is required

10) Checking if "small" window action is required:
If (Increase in out across
BaSmallWindow_u1) / BaT1_W)
  < BaLim1_du_dt_SW
& (Out with BaOut = 0) < BaLim1_u
& (drop in DP across BaSmallWindow_DP
/ BaT1_W)
  > BaLim1_dDP_dt_SW
& current DP_choke <= previous
DP_choke then
"small" window action is required 11) Computing "jump" in Out when
"small" or "large" window action is required:
If (Out with BaOut = 0) < BaLim1_u_KP
then
  If ((Out with BaOut = 0) +
BaOpening) >= BaLim2_u_KP then
    BaOut = (lim2_u_KP_BA - Out
with BaOut = 0))
    * BaKP_scaling2
  else
    BaOut_temp = BaOpening
  end
elsif (Out with BaOut = 0) <
BaLim2_u_KP then
  If (Out with BaOut = 0) +
BaOpening * BaKP_scaling
    >= BaLim2_u_KP then
    BaOut = (BaLim2_u_KP -
BaTmp2) * BaKP_scaling2
  else
    BaOut = BaKP_scaling *
BaOpening
  end
else
  BaOut = 0
end 12) Wait after "large" window action:
If elapsed waiting time < BaT5_W then
  BaWt2_enable = 1
else
  BaWt2_enable = 0
end 13) Wait after "small" window action
If elapsed waiting time < BaT2_W then
BaWt_enable = 1 else
  BaWt_enable = 0
end

Fig. 4b

METHOD AND A SYSTEM FOR ENHANCED FLOW LINE CONTROL

CROSS-REFERENCE TO RELATED APPLICATIONS

This application claims priority to Norwegian patent application 20052273 filed 10 May 2005 and is the national phase under 35 U.S.C. 371 of PCT/IB2006/001183 filed 9 May 2006.

FIELD OF INVENTION

The present invention relates to a method and system for automatically controlling a flow in a flow line system, said flow line system including a flow line inlet and outlet, a control valve or choke located in the flow line at the outlet, and a control unit controlling the opening of the valve or choke. The present invention also relates to a computer program product for executing one or more steps of the method.

In a first aspect, the invention is used for avoiding liquid blockages in flow line systems. Liquid blockages causes flow line systems to be slugging, which is highly undesirable from an operational point of view. In a second aspect, the invention is used for providing a set point to a control unit controlling the opening of the valve or choke for enhanced control of the fluid flow in the flow line. The invention may typically be applied in the oil and gas production industry for enhanced control of flow lines. Typical flow lines are pipelines, well production lines (or wells), and risers.

BACKGROUND

In oil and gas production systems, unstable flow in flow lines might cause serious and troublesome operational problems for the downstream receiving production facilities. Typical flow lines are pipelines, wells, or risers. Common forms of flow variations are slug flow in multiphase pipelines and casing heading in gas lifted oil wells. In both cases the liquid flows intermittently along the pipe in a concentrated mass, called a slug. The unstable behaviour of slug flow and casing heading has a negative impact on the operation of oil and gas production system, such as offshore facilities. Severe slugging can even cause platform trips and plant shutdown. More frequently, the large and rapid flow variations cause unwanted flaring and limit the operating capacity in the separation and compression units. This reduction is due to the need for larger operating margins for both separation (to meet the product specifications) and compression (to ensure safe operation with minimum flaring). Backing off from the plant's optimal operating point results in reduced throughput.

Three approaches are conventionally practiced to manage the instabilities in wells, pipelines, or risers:
  Choking the flow
  Increasing the gas lift rate
  Providing overcapacity to accommodate the gas and liquid slugs Recently, a new alternative method using automatic feedback control was disclosed in the international application WO 02/46577. This method uses measurements of pressure, flow, or temperature as input to an automatic feedback controller for the purpose of stabilizing the flow by continuously manipulating the flow line outlet choke/valve. The measurements are taken upstream of the point where the main part of the slug is formed or is about to occur. Studies using other measurements than the inlet pressure for stabilization are disclosed in E. Storkaas and S. Skogestad: "Cascade Control of unstable systems with application to stabilization of slug flow", presented at IFAC-symposium Adchem '2003. The authors use linear feedback controllers, which continuously manipulate the outlet valve opening in order to stabilize the flow line.

However, one significant challenge of operating an inlet pressure feedback controller such as the one in WO 02/46577, is to select the inlet pressure set point given to the controller. Some rules of thumb are given in WO 02/46577 without disclosing any specific solution. The set points given to the feedback controller in WO 02/46577 are also assumed to be manually selected/changed. To realize the importance of the inlet pressure set point, it should first be noted that flow rates into the flow line generally will increase if the flow line inlet pressure decreases. This means that in order to maximize the production from the flow line, its inlet pressure should be kept stable and as low as possible by the feedback controller. However, one cannot use an arbitrary low set point for the inlet pressure. Firstly, it might be impossible for the controller to stabilize the flow line at a too low set point. Secondly, the controllability, that is, the ability to control the inlet pressure using the flow line outlet valve, might become poor. This is due to the fact that by lowering the set point, the valve will typically operate at a valve opening which is, in average, larger. This again implies that the pressure drop across the valve might become very small.

The pressure drop, dP, across the valve gives a measure of the influence changes in the valve opening will have on the fluid movements in the flow line.

In addition, experience has shown that sudden drops in the liquid outflow from the flow line and the associated dP across the outlet valve may occur also after the flow line has been stabilized. The result is poor controllability of the flow line, meaning the outlet valve opening will have little or no effect on the outlet liquid flow. This means that if there is an automatic feedback control law manipulating the outlet valve opening, this will lose control over the flow line and flow instabilities will occur if the flow line is unstable without using feedback control.

As an example, let P1 denote the flow line inlet pressure, P2 the upstream valve pressure, P3 the downstream valve pressure and let the pressure difference across the valve be denoted by dP=P2−P3. The valve is assumed to be located at the outlet of the flow line. The inlet flow to the flow line will normally increase if P1 decreases. If dP decreases at the same time, indicative of the liquid outflow rate from the flow line is being reduced (assuming a constant valve opening), a mass imbalance in the flow line results. Hence, a liquid blockage in the flow line is probable to occur. In addition, if for example a standard linear PID (Proportional+Integral+Derivative) controller is used for controlling the flow line inlet pressure, the controller might order the valve to reduce its opening (depending on the tuning and choice of inlet pressure set point). The result of this will be an even lower outlet flow. Also, a sudden reduction of the liquid flow out of the pipeline/well may not be sufficiently observable in the inlet pressure before it is too late, that is, before the liquid plug has been established in the flow line. Hence, control laws using only measurements at the flow line inlet for feedback control will probably fail in preventing the drop in the outflow. Therefore, maintaining controllability of the flow line, that is, preventing the liquid outflow from the flow line from approaching zero even for a stabilized flow line, is a significant challenge.

FIG. 5 shows real-site data of a stabilized pipeline. The inlet pressure P1 exhibits relatively small variations (up to time=5 hours). However, at time=3.25 hours, a sudden decrease in the pressure drop across the valve dP occurs. At the same time, P1 is also decreasing. This eventually results in the building-up of a liquid slug and an unstable pipeline flow. This can be observed in the inlet pressure from time=5 hours.

It is however not necessary that a decrease in the inlet pressure takes place in order for a drop in dP to be problematic. This is illustrated by the real-site data shown in FIG. 6. At time=6 hours, a sudden drop in dP results in an unstable pipeline although P1 does not decrease whilst the sudden drop in dP takes place.

For an overview of prior art control methods for stabilization of flow lines, reference is made to the international application WO 02/46577 and its cited references. However, none of the methods in these references, including the method described in WO 02/46577, address the specific problem of preventing that a sudden drop in the liquid outlet flow results in poor flow line controllability, possibly liquid blockage, and eventually an unstable flow line.

SUMMARY OF THE INVENTION

An objective of the present invention is to provide a method and a system for enhanced control of fluid flow in a flow line. Another objective of the invention is to provide a method and a system adapted to secure a stable flow in the flow line, by preventing the outlet liquid flow from the flow line becoming and staying relatively small, giving rise to poor controllability, mass imbalance (mass inflow differing from mass outflow), and finally a liquid blockage. A further objective of the present invention is to provide a method and a system for ensuring that the controllability of the flow line is maintained.

According to a first aspect, the invention is achieved by means of the initially defined method, characterized in that the method includes the steps of:
controlling the opening of the valve or choke by means of a control unit,
measuring or estimating an outlet flow rate or a pressure upstream of the valve or choke, or a pressure difference across the valve or choke, or a fluid density, or a fluid temperature, or any combination thereof, and opening of the valve or choke,
determining if a sudden drop occurs in any of the measurements or estimates,
deciding if a liquid blockage in the flow line is present or approaching based on the measurements or estimates, and if a liquid blockage is indicated as present or approaching,
increasing the opening of the valve or choke by an amount determined by the measurements or estimates,
inhibiting any further manipulation of the valve or choke before a non-zero time period has expired, and
repeating the steps according to the above.

The term sudden drop should be understood to mean a decrease faster than decreases experienced during normal and preferred operating conditions.

The method step of increasing the opening of the valve or choke, should be understood to mean that the increase of the valve opening can be a function of the measured or estimated (current) valve opening.

The method step of inhibiting any further manipulation of the valve or choke, should be understood to mean that this only includes the valve or choke manipulation performed by the method/system itself according to the invention, and it is not required to prevent any valve or choke manipulation performed by other functionalities/systems, such as automatic feedback control of the flow line inlet pressure.

According to a second aspect, the invention is achieved by means of the initially defined method including the steps of:
measuring or estimating an inlet pressure or inlet flow rate at the inlet,
controlling the opening of the valve or choke by means of a first control unit comprising an automatic feedback controller as a function of the measurements or estimates of the inlet pressure and an inlet pressure set point, or the inlet flow rate and an inlet flow rate set point, characterized in that the method comprises the further steps of:
measuring or estimating an outlet fluid flow rate, and/or a pressure drop across the valve or choke, and/or a valve or choke opening,
automatically determining a value for the inlet pressure or the inlet flow rate set point in a second control unit comprising an automatic feedback controller, and
providing said inlet pressure or inlet flow rate set point to said first control unit.

According to a preferred embodiment of the invention, the method and system will automatically calculate an inlet pressure- or flow set point, used by an automatic feedback controller for the inlet pressure or inlet flow using the outlet valve or choke, to ensure a constant average pressure drop across the outlet valve/choke and/or a constant average valve/choke opening and/or a constant average fluid flow rate, thereby ensuring that the controllability of the flow line is maintained. Furthermore, the method and system will, based on the current operating conditions, adjust the outlet valve/choke opening if there is an unexpected and significant drop in the liquid outflow. The adjustment is carried out in terms of a quick opening of the outlet valve/choke at isolated points in time to prevent that the liquid outflow becomes, and remains, critically low for some period of time. The valve or choke is hereby being opened, preferably in one step, by a determined amount, which is either predefined or automatically computed, and substantially as rapidly as the valve or choke permits.

The flow line is assumed to carry fluids such as liquid and gas. The invention would typically be applied to flow control of slugging multiphase oil and gas flow lines. The invention does not normally require any new equipment to be installed.

Preferably, the value for the inlet pressure- or the inlet flow rate set point is determined such that the pressure drop across the valve/choke or valve/choke opening or outlet flow rate is kept at a substantially constant value.

Preferably, the status of the flow in the flow line with respect to stability or instability is obtained via a human-machine interface comprising input means arranged therefore and/or input means from an external system.

Preferably, the method comprises the further steps of:
measuring or estimating a flow rate or a pressure, or a fluid temperature at the inlet of the flow line,
determining a mass balance of the flow line system, and
deciding if said liquid blockage is present or approaching based on said mass balance.

Preferably, the method comprises the further steps of:
measuring or estimating a trend value of the outlet flow rate or the pressure upstream of the valve or choke, or the pressure difference across the valve or choke, or the fluid density, or the fluid temperature, or any combination thereof, and the opening of the valve or choke in a first window moving with time,
measuring or estimating a trend value of the outlet flow rate or the pressure upstream of the valve or choke, or the pressure difference across the valve or choke, or the fluid density, or the fluid temperature, or any combination thereof, and the opening of the valve or choke in a second window moving with time, and if said trend value measured or estimated in the first window falls below a defined percentage of the trend value, either predefined or automatically computed, measured or estimated in the second window, deciding whether said liquid blockage is present or approaching.

Preferably, a pressure differential across the valve is measured, and if said pressure differential exceeds a predetermined or automatically computed value, the manipulation of the valve or choke is inhibited.

Preferably, the valve or choke is controlled only when a predefined time period has expired since last opening step.

The present invention is also achieved by means of the initially defined system, characterized in that the system comprises:
- a control unit controlling the opening of the valve or choke,
- means for measuring or estimating an outlet flow rate or a pressure upstream of the valve or choke or a pressure difference across the valve or choke, or a fluid density, or a fluid temperature, or any combination thereof, and opening of the valve or choke,
- means for determining if a sudden drop occurs in any of the measurements or estimates,
- means for deciding if a liquid blockage in the flow line is present or approaching based on the measurements or estimates, and if a liquid blockage is indicated as present or approaching,
- means for increasing the opening of the valve or choke by an amount determined by the measurements or estimates, and
- means for inhibiting any further manipulation of the valve or choke before a non-zero time period has expired.

According to a preferred embodiment of the present invention the system comprises:
- means for measuring or estimating an inlet pressure or inlet flow rate at the inlet,
- a first control unit comprising an automatic feedback controller arranged to control the opening of the valve or choke as a function of the measurements or estimates of the inlet pressure and an inlet pressure set point, or the inlet flow rate and an inlet flow rate set point, and is characterized in that the system comprises:
- means for measuring or estimating an outlet fluid flow rate from the flow line, and/or a pressure drop across the valve or choke, and/or the valve or choke opening,
- a second control unit comprising an automatic feedback controller arranged to automatically determining a value for the inlet pressure or the inlet flow rate set point to said first control unit, and
- means for providing said inlet pressure- or inlet flow rate set point to said first control unit.

Further advantageous features of the present invention will appear from the following description and the appended claims.

BRIEF DESCRIPTION OF DRAWINGS

For a better understanding of the present invention, a specific description of the invention will now be made by way of examples with reference to the accompanying drawings in which.

DETAILED DESCRIPTION OF THE INVENTION AND PREFERRED EMBODIMENTS THEREOF

The inventive method and system make use of measurement(s) at the flow line outlet, and possibly at the flow line inlet, for adjusting the opening of the outlet valve or choke at the flow line outlet. In a first aspect, the valve or choke opening adjustment can be carried out directly by the inventive control method/system and/or in a second aspect by letting the inventive control method/system automatically provide set points to another control system that controls the inlet pressure or the inlet flow rate of the flow line. Such another control system including an inlet pressure controller is described in the International application WO 02/46577 of which the entire content hereby is incorporated by reference.

Figure 1:
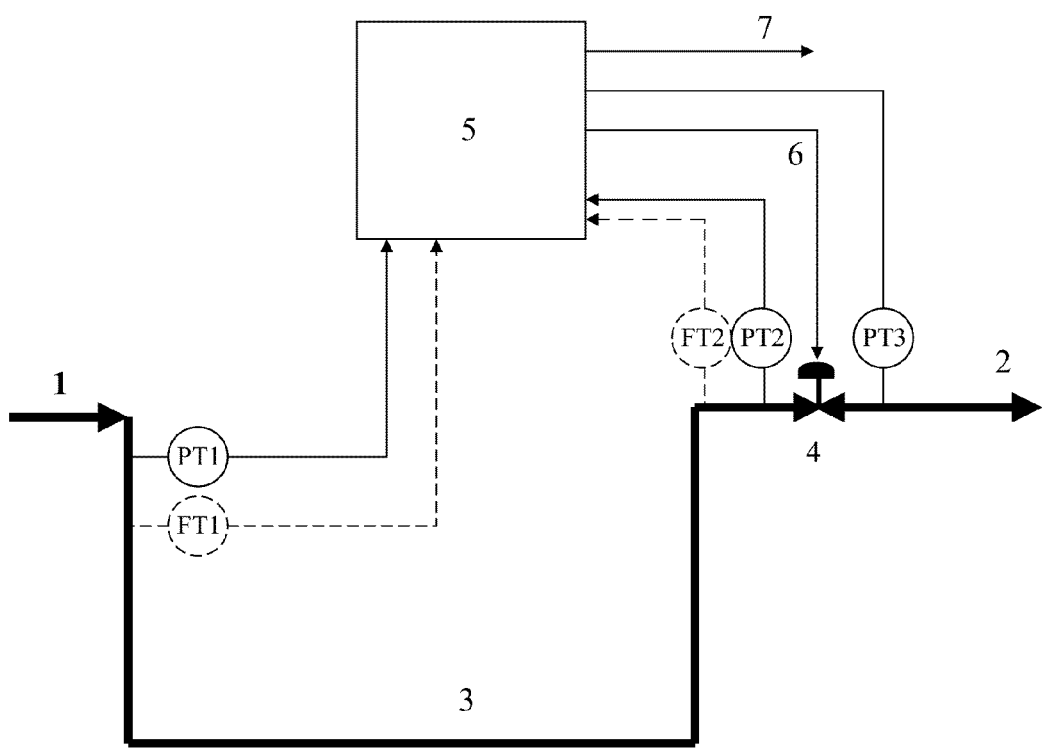
FIG. 1 schematically shows a flow line system according to one embodiment of the invention.
Figure 4A:
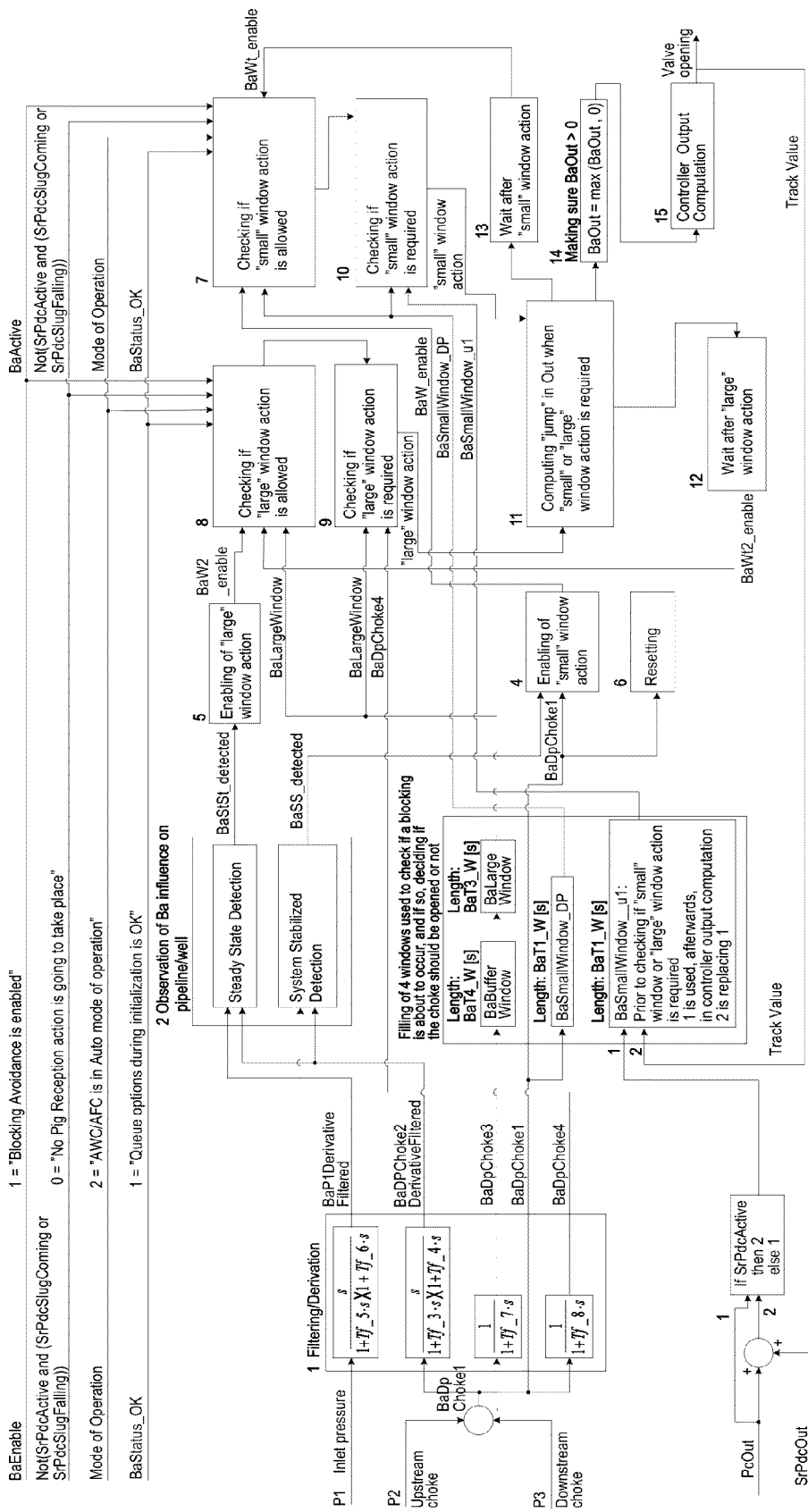
FIG. 4 a,b show a block diagram and associated algorithms for the functionality of opening the outlet valve or choke under certain circumstances for the control unit of FIG. 3.
Figure 5:
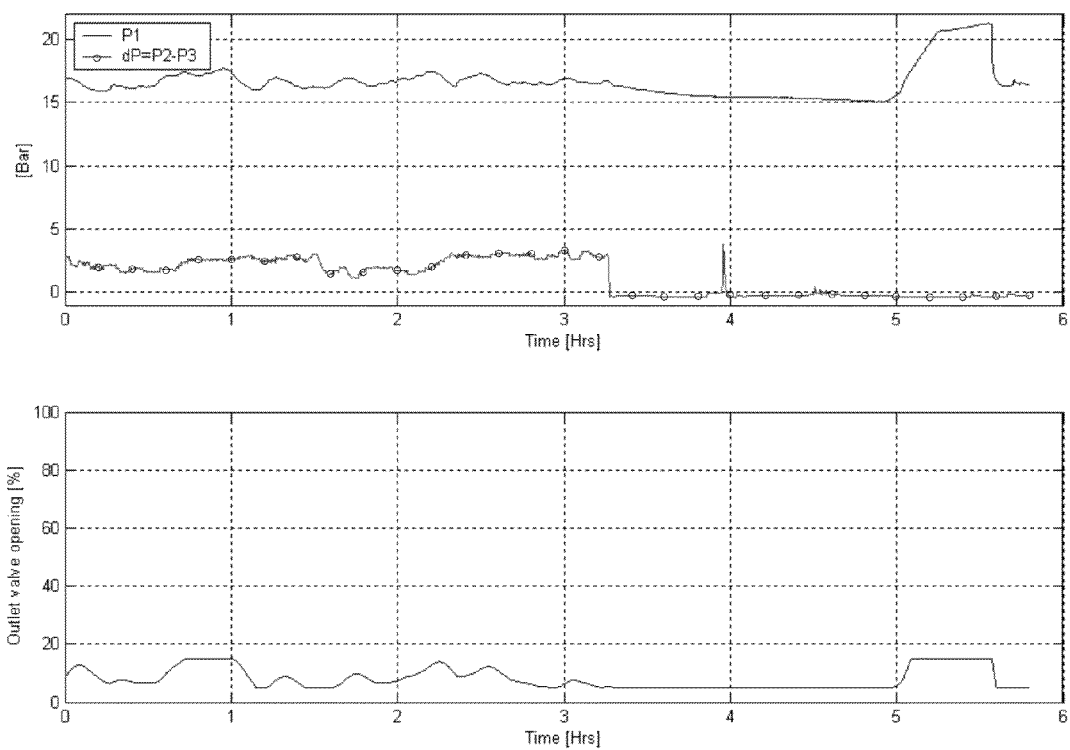
FIG. 5 shows real-site data from a pipeline illustrating the sudden decrease in the pressure drop across the valve and the resulting instability.
Figure 6:
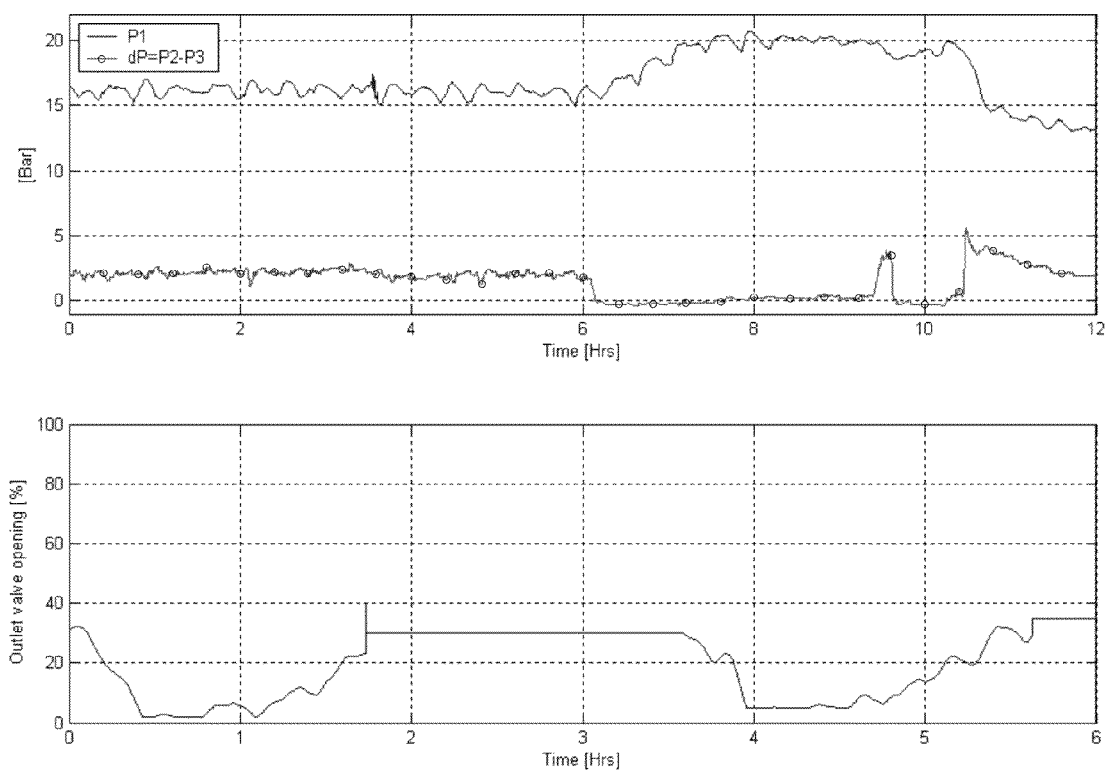
FIG. 6 shows real-site data from a pipeline illustrating another example of sudden decrease in the pressure drop across the valve and the resulting instability.

FIG. 1 schematically shows a flow line system in which the method and system according to the present invention may be used for automatically controlling the flow. The flow line system includes a flow line 3, a flow line inlet 1 and outlet 2, and a control valve or choke 4 arranged in the flow line 3 at the flow line outlet 2. The flow line system could for example be located between a wellhead platform upstream the flow line inlet 1 and a processing platform downstream the flow line outlet 2. The embodiment as shown in FIG. 1 further employs at least one means for measuring or estimating the liquid outlet flow from the flow line, and a control algorithm implemented in the control unit 5 (also see FIGS. 3 and 4). Dependent on the available measurements, the outflow can be measured or estimated by, for example, 1) using measurements from a multiphase flow meter that measures the outlet liquid flow FT2, 2) using the pressure difference dP=PT2−PT3 across the valve or choke as an indication of changes in the outflow, 3) or using dP across the valve or choke in combination with the valve opening and/or densitometer and/or temperature measurements for estimating the outflow. In addition, measurements of the inlet pressure PT1 and/or inlet flow rate FT1 may be used to obtain an indication whether the inflow to the flow line is increasing or decreasing. However, as shown in FIG. 5 and FIG. 6, this is not crucial information. Through the control algorithm implemented in the control unit 5, comprising an automatic feedback controller, the resulting control signal 6 is calculated and sent to the valve or choke 4, and set point signal 7 for the inlet pressure PT1 are calculated and made available to a possible automatic feedback controller for the inlet pressure. According to this embodiment of the present invention, the method/system may be seen as stand-alone.

Figure 2:
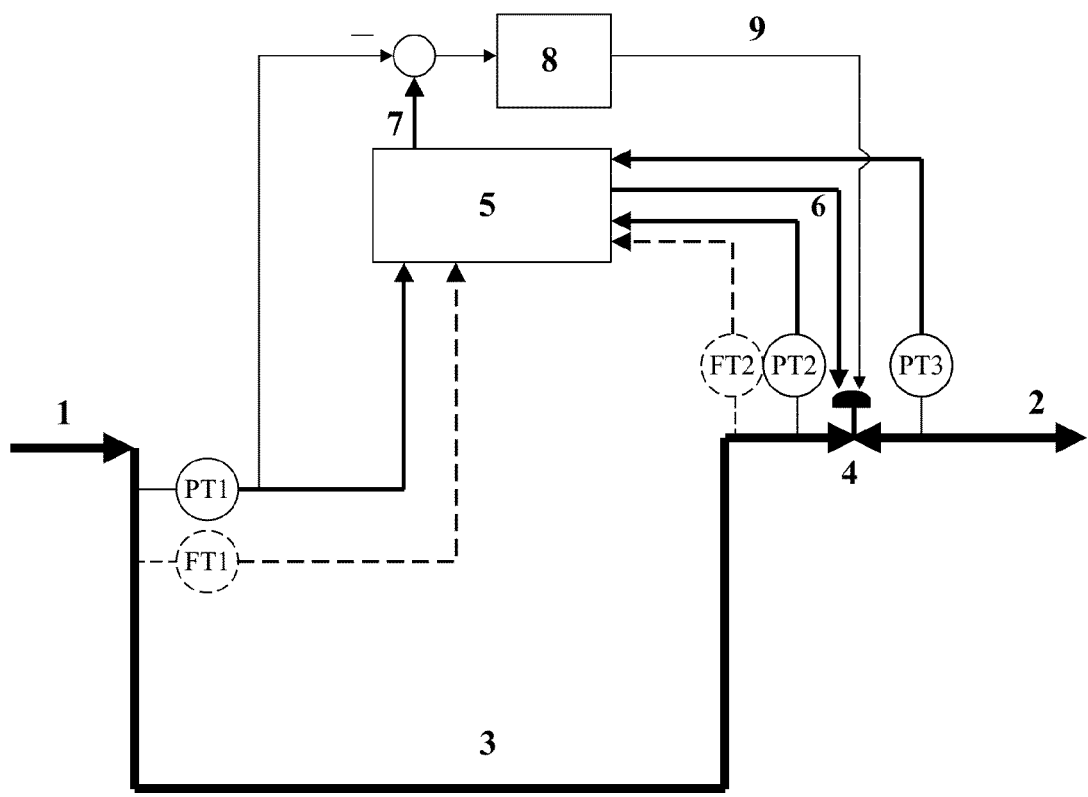
FIG. 2 schematically shows another embodiment of the invention including its interactions with an inlet pressure control unit.

The present invention can also interact with a prior art automatic feedback controller 8 that controls the inlet pressure by continuously manipulating the same outlet valve or choke 4. This is illustrated in FIG. 2. According to this preferred embodiment the control unit 5, comprising an automatic feedback controller, automatically provides set points 7 for the inlet pressure PT1 to an automatic feedback controller 8 (inlet pressure controller), which is also manipulating the outlet valve 4 by means of the control signal 6 in addition to control signal 9. Typically signal 6 is added to signal 9 and the sum is sent as an opening signal to the valve or choke 4. The inlet pressure set point 7 given to the automatic feedback controller is hereby automatically adjusted. The set point is changed such that the pressure drop across the manipulated valve or choke 4 is kept at a substantially constant value. This can be regarded as an optimizing feature if the chosen set point for the pressure drop is very low, in the sense that the set point for the inlet pressure will be automatically calculated by the inventive control method/system and will be as low as possible while maintaining control of the flow line. The choice of the value that corresponds to a "very low" pressure drop across the valve is typically based on experience.

One of the basic principles behind the inventive method/system is to detect if the outlet flow rate or the pressure PT2 upstream of the valve or choke, or the pressure difference dP across the valve or choke, or the fluid density at the flow line outlet, or the fluid temperature upstream the valve or choke, or any combination thereof, decreases significantly by a sudden drop, and if so, to prevent a sustained drop by abruptly open the outlet valve or choke by a defined amount, which may be predefined or automatically computed, and as rapidly as the valve or choke permits. Hence, the method will first detect if the outlet flow is decreasing more than normal or is ceasing. What is normal will be dependent on the specific case and based on experience. After the control method/system detects a sudden drop in any of the above-mentioned parameters, it determines if it is necessary to quickly open the valve in order to counteract this sudden drop. If a quick opening of the valve is necessary, the method/system will open the valve in an abrupt manner trying to re-establish the outlet flow. The amount the valve is opened depends on the current operating condition (see below). The inventive control method/system will only adjust the valve opening, in terms of an opening, at isolated points in time. This is in contrast to, for example, an automatic feedback controller for the inlet pressure, which will continuously manipulate the valve opening. The timing of the opening of the valve and how much the valve is opened are two critical factors in deciding the success of the method.

There are two situations in which the control method/system will not open the valve regardless of a significant drop in the outlet flow. The first situation is if the pressure drop across the valve is large. This is to avoid harming the downstream equipment. The second situation is if the method/system just has opened the valve. If the method/system just has taken action in terms of a quick opening, it must wait a non-zero time period before it is allowed to open the valve again, that is, inhibiting any further manipulation of the valve or choke before a non-zero time period has expired. The non-zero time period could be predefined or automatically computed. The time period depends on the specific operational conditions of the flow line system to be controlled. The inhibition is to be understood to be related only to the inventive method/system meaning that valve or choke manipulation(s) performed by other functionalities/systems, such as automatic feedback control of the flow line inlet pressure, is not inhibited.

Example of Preferred Algorithms

Figure 3:
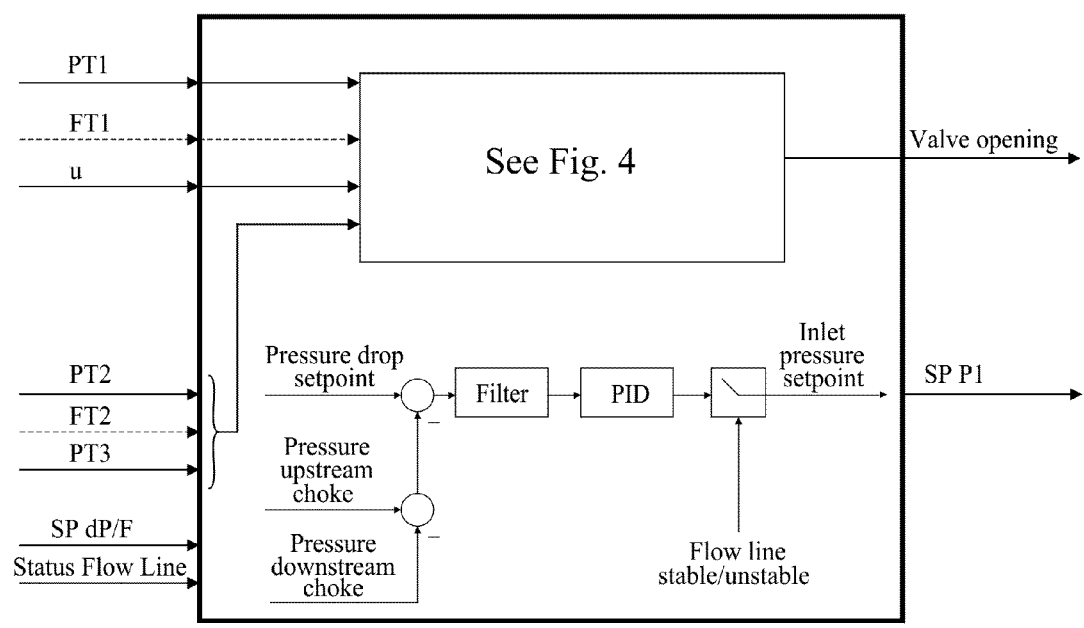
FIG. 3 shows a control unit according to the invention in more detail.

Referring to the control system shown in FIG. 3, the input signals to the control unit 5 are measurements or estimates of the flow line inlet pressure PT1, current valve opening value u, upstream valve pressure PT2, downstream valve pressure PT3, set point for dP=PT2−PT3, and the status of the flow line, that is, whether the flow line is stable or unstable (slugging). The output signals from the control unit are valve opening value(s) and set point(s) for the inlet pressure PT1. It is indicated in FIG. 3 that PT1 can be replaced by an inlet flow rate measurement or estimate FT1, whilst PT2 and PT3 can be replaced by an outlet flow rate measurement FT2 or estimate.

The inventive method/system calculates the pressure drop across the valve dP and subtracts this from the set point for dP which is, for example, provided by an operator. The result is, for example, sent to a $1^{st}$ order low-pass filter which may be described as:

$$FilteredValue_k = \exp\left(-\frac{T\_sample}{T\_filter}\right) \cdot FilteredValue_{k-1} + \left\{1 - \exp\left(-\frac{T\_sample}{T\_filter}\right)\right\} \cdot Value_k$$

where T_sample is the sampling time and T_filter is the filter time constant. The filtered value is, for example, sent to a PID controller (controller with Proportional, Integral and Derivative action), as shown in FIG. 3 by way of a preferred example, whose output will be the set point for the inlet pressure. The set point for the inlet pressure is preferably continuously changed to maintain the pressure drop across the valve or choke at a substantially constant value. However, this set point has no meaning if the flow line is unstable. Hence, the set point will not be used if the flow line is slugging. This means that information about the stability of the flow line ("Status Flow Line", see FIG. 3) must be provided, for example, by an operator via a human-machine interface comprising input means arranged for providing the status of the flow in the flow line with respect to stability or instability and/or input means for obtaining such information from an external system.

At the same time, the inventive control method/system monitors the pressure drop across the valve and takes action if the pressure drop suddenly decreases abnormally fast (cf. FIG. 5 and FIG. 6). FIG. 4 shows a detailed block-diagram of how this can be carried out.

The different blocks of the block-diagram of FIG. 4 will now be described.

1) Filtering/Derivation

In this pre-processing block the raw values of the flow line inlet pressure, P1, and the pressure drop across the valve (dP=P2−P3) are processed by a $1^{st}$ order low-pass filter, and, in two cases, by a differentiation with respect to time combined with a second $1^{st}$ order filter (to limit the derivative action at high frequencies). These pre-processed values of P1 and dP are then used as input to several succeeding blocks.

2) Observation of Ba (Blocking Avoidance) Influence on the Pipeline/Well

This block contains two sub-blocks: a Steady State Detection block and a System Stabilized Detection block. Both of these sub-blocks process the two filtered time derivatives from the Filtering/Derivation block. In the Steady State Detection block it is detected whether the flow line is in steady state or not. By the term steady state it is meant that the flow line pressures are stable. This is carried out by checking if the absolute values of the time derivatives are small enough over a long enough period of time (BaT7_W seconds). In the System Stabilized Detection block, it is checked if the values of the time derivatives are contained in a given band for a certain period of time (BaT6_W seconds). By the term system stabilized it is meant that the flow out of the pipeline/well is "picking up", i.e. the flow out of the pipeline/well has been "saved" from ceasing. Typically this is characterized by that the time derivative of dP is large enough while the time derivative of P1 (FIG. 4: PT1) is small enough for a certain period of time (BaT6_W seconds).

3) Filling of Four Windows Used to Check if a Liquid Blockage is about to Occur, and if so, Deciding if the Valve should be Opened or not As illustrated in FIG. 4, by way of example, there are four windows/queues moving with time: BufferWindow, LargeWindow, SmallWindow_DP, and SmallWindow_CoOut. These windows keep track of the evolution or trend of dP, a filtered version of the dP, and the valve movement, contributing to the functionality according to this embodiment of the present invention. The windows/queues are preferably of the type First In First Out (FIFO). The BufferWindow before the so-called LargeWindow (second window) is used in order to make the values contained in the LargeWindow represent the "normal" range of values for a filtered version of dP in a steady state situation for the flow line. The LargeWindow is used in connection with detecting if a liquid blockage is about to occur after the flow line has reached a steady state. The so-called SmallWindow_DP (first window) contains the evolution of a non-filtered version of dP. Generally it might be required to filter the dP values contained in the SmallWindow_DP also. The SmallWindow_DP is used in connection with detecting if a liquid blockage is about to occur during the initial phase of stabilization after a slug has been received.

It should be noted that the sizes of the "small" and "large" window (BaT1_W and BaT3_W seconds) are determined by the user/operator, and, in general, the "small" window may be larger than the "large" window (BaT1_W>BaT3_W). If there is another controller that for example controls the inlet pressure, the SmallWindow_CoOut is used in order to keep track of how this other controller is contributing to the total output given to the valve. If, for example, the inlet pressure controller is opening the valve sufficiently by itself such that a liquid blockage is expected to be avoided, the inventive control method/system will have zero contribution to the total output given to the valve. In the case when the system contributed with a positive "jump" in the total output, it could possibly lead to a subsequent destabilization of the flow line, because the flow line inlet pressure, and hence the potential energy in the flow line, could be drawn too low to sustain the possibility of carrying liquid up the flow line, such as a riser/well. To make sure that the output sent to the valve is queued in SmallWindow_CoOut, this window must be updated when the computation of the total output given to the valve is finished (including upper/lower bounding of the final valve signal). This is carried out in the Controller Output Computation block.

4) Enabling of "Small" Window Action

By enabling of "small" window action it is meant that the inventive method/system may contribute by a positive "jump" to the total output given to the valve if it is required in order to avoid a liquid blockage in the flow line, and if in addition it is allowed (see below). Whether it is required or not is based on the evolution of dP and the evolution of total output from the inlet pressure controller contained in SmallWindow_DP and SmallWindow_CoOut, respectively. For "small" window action to be enabled it is required that the dP across the valve is below a certain limit (BaLim1_DP), the reason being that if the valve suddenly is opened with a high dP across it, it may cause serious downstream problems that are more important to avoid than it is to stabilize the flow line. Additionally, the flow line should not already be considered as stabilized.

This enabling block could just as well have been integrated with the block Checking if "small" window action is allowed, and the resulting integration named Enabling of "small" window action or Checking if "small" window action is allowed.

5) Enabling of "Large" Window Action

The meaning of enabling is the same in this case as for enabling of "small" window action. For enabling of "large" window action it is required that it has been detected that the flow line is in steady state and that sufficient time has elapsed so that the LargeWindow is filled. (The BufferWindow is, in fact, necessarily filled if the LargeWindow is filled.)

This enabling block could just as well have been integrated with the block Checking if "large" window action is allowed, and the resulting integration named Enabling of "large" window action or Checking if "large" window action is allowed.

6) Resetting

If the pressure drop dP across the valve exceeds a certain limit (BaLim1_DP), the enabling of "small"- and "large" window action is reset, and so is the detection of steady state as well as the detection of system stabilized. This means that if dP exceeds this limit, the inventive control method/system will not contribute to the total output given to the valve. Thus, there will be a zero contribution from the inventive control method/system.

7) Checking if "Small" Window Action is Allowed

"Small" window action is allowed only if it is enabled, the inventive control method/system itself is enabled, all queue operations during initialization (i.e. 1st cycle run) were all right, and no waiting after last "small" window action is going on.

Reference is also made to the above description of Enabling of "small" window action.

8) Checking if "Large" Window Action is Allowed

"Large" window action is allowed only if it is enabled, the inventive control method/system itself is enabled, all queue operations during initialization (i.e. the 1st cycle run) were all right, and no waiting after the last "large" window action is going on.

9) Checking if "Large" Window Action is Required

Action in the sense of creating a positive "jump" in the valve/choke opening in order to avoid liquid blockage in the flow line is required if the current filtered dP across the valve is less than a certain percentage of the lowest filtered dP contained in the "large" window. This lowest dP represents a "normally" low dP in steady state.

This should be understood to mean that if the current flow estimate is very low compared to what is normal in steady state, the flow probably is ceasing and that the valve/choke should be "jumped" open to get the flow going again.

10) Checking if "Small" Window Action is Required

Action in the sense of creating a positive "jump" in the valve/choke opening in order to avoid liquid blockage in the flow line is required if the increase in output to the valve/choke across the SmallWindow_CoOut, assuming zero contribution from the inventive control method/system, at current sample is too small, and the output to the valve/choke, with zero contribution from the method/system, is not too high already, and the drop in valve dP during the time period representing the "small" window is large enough, and the current sample of the valve dP is smaller than the one at the previous sample.

This should be understood to mean that if the flow out of the flow line has been dropping rapidly for a while after having received a slug, and is currently dropping rapidly as well, the valve/choke should be rapidly opened by the control method/system to get the flow going again, to avoid another slug forming, provided that the choke/valve is not already opening fast enough and the choke/valve is not already too open (so as to reduce the risk of causing problems downstream).

11) Computing "Jump" in Out when "Small" or "Large" Window Action is Required

If it is found that "small" or "large" window action is required, it is essentially attempted to add a positive value from the control method/system to BaOpening which is given to the choke/valve. If, however, the opening with zero contribution from the method/system exceeds BaLim1_u_KP, but is below BaLim2_u_KP, BaOpening is scaled by BaKP_scaling. If the opening with zero contribution from the method/system exceeds BaLim2_u_KP the contribution from the method/system will be zero.

If the resulting valve opening exceeds BaLim2_u_KP after adding the contribution from the method/system, the resulting contribution from the method/system will be a percentage, given by BaKP_scaling2, of the difference between BaLim2_u_KP and the choke/valve opening with zero contribution from the method/system.

12) Wait after "Large" Window Action

After a "large" window action has taken place, a certain period of time (BaT5_W seconds) should pass before the next "large" window action is allowed.

13) Wait after "Small" Window Action

After a "small" window action has taken place, a certain period of time (BaT2_W seconds) should pass before the next "small" window action is allowed.

14) Making Sure BaOut>=0

The action from the control method/system in terms of an adjustment of the valve opening should be positive.

15) Controller Output Computation

The choke/valve output signal is ready to be sent to the valve.

Figure 7:
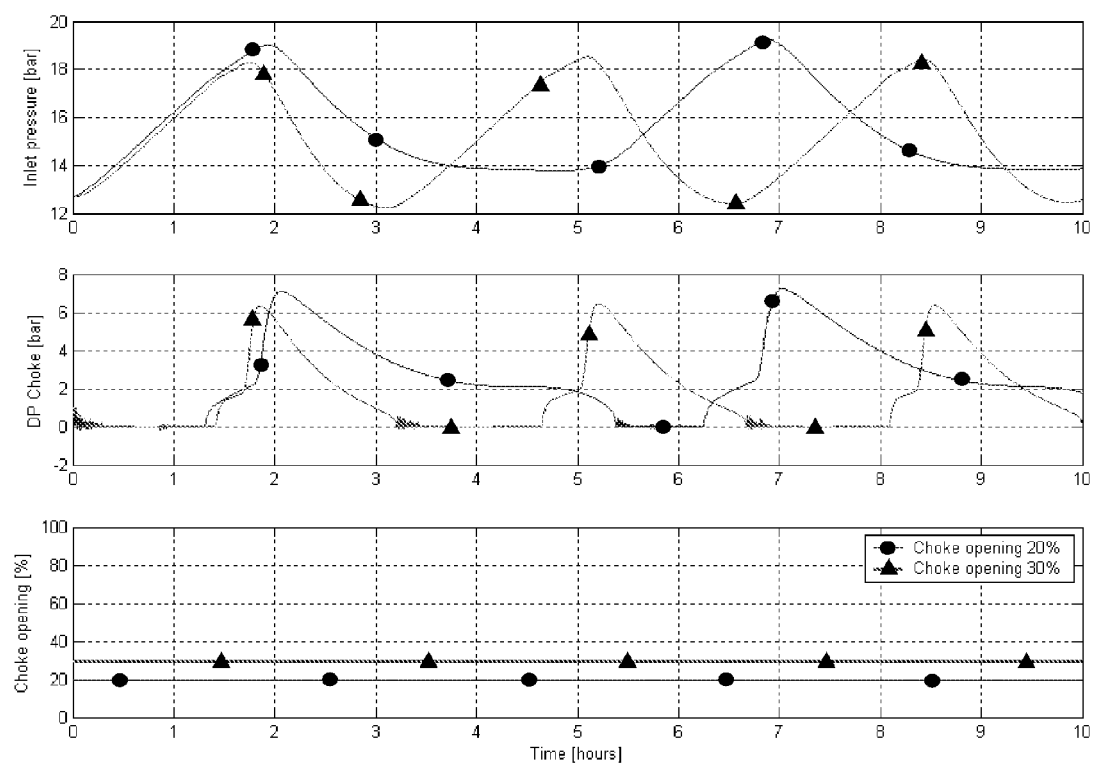
FIG. 7 shows an unstable pipeline with two different (constant) valve openings. The figure is the result of OLGA simulations (OLGA: Oil and gas simulator software from Scandpower Petroleum Technology AS).
Figure 8:
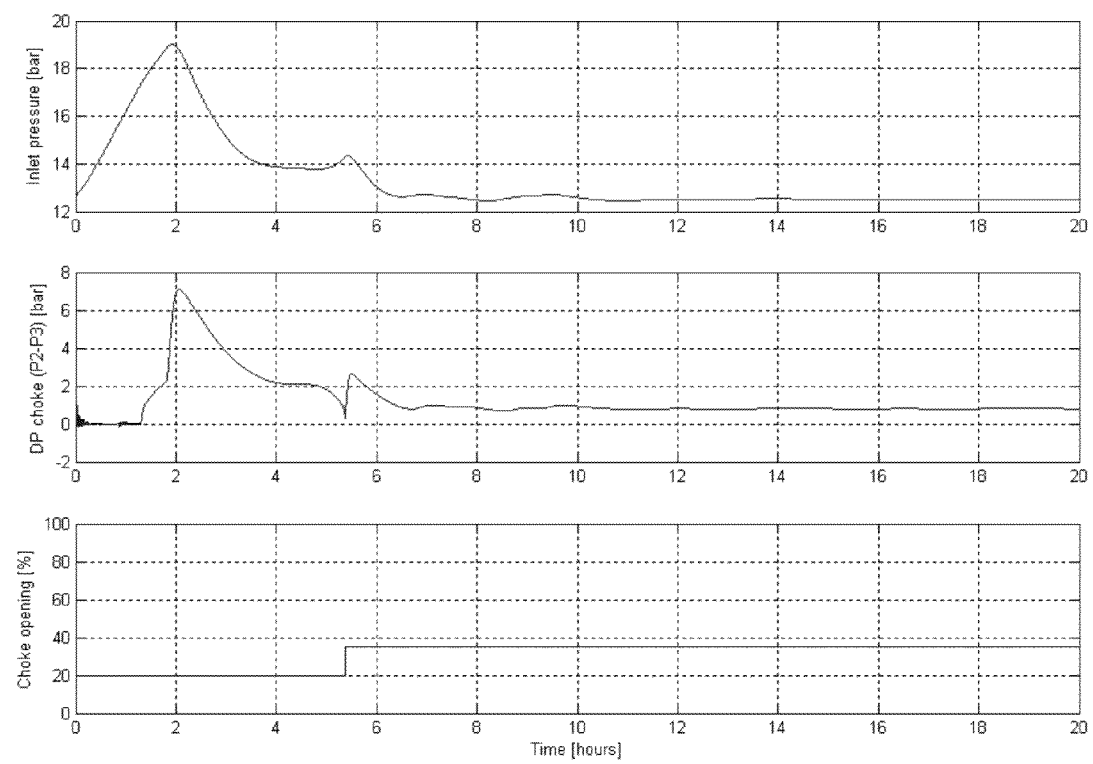
FIG. 8 shows data from OLGA simulations where the invention is used for stabilizing a pipeline flow without an inlet pressure control unit.

The currently described control method and system have been tested by using OLGA simulations of a pipeline. The pipeline is slugging (unstable) using constant valve openings of 20% and 30%. This is shown in FIG. 7. The inventive method/system was tested without using an automatic feedback control for the inlet pressure and the result is shown in FIG. 8. The system was turned on at time=4 hours. It can be seen that it takes action at time=5.4 hours by increasing the valve opening in a nonlinear manner when the pressure drop across the valve starts to suddenly drop. The result is that the flow line is stabilized and the decrease in the pressure drop across the valve stops.

Figure 9:
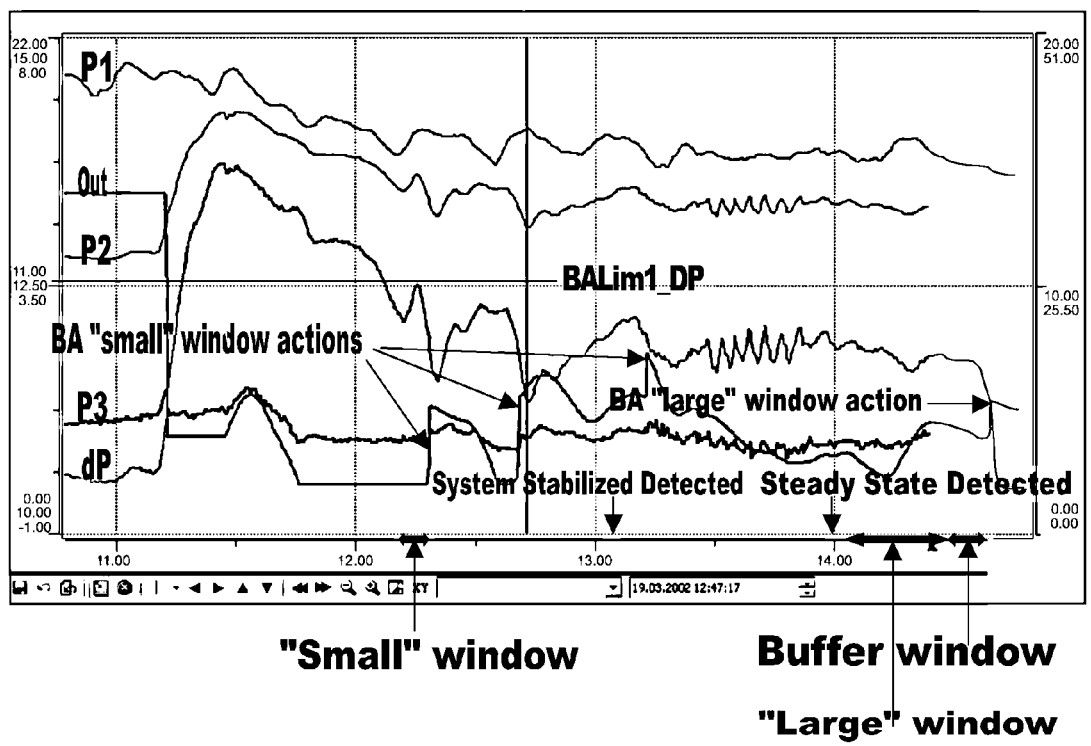
FIG. 9 shows real-site data illustrating the interactions between the inventive control unit and an inlet pressure control unit resulting in a stabilized pipeline.

FIG. 9 shows real operational data from control of a slugging pipeline by using the inventive method/system together with an inlet pressure controller. "Out" in the figure is the commanded valve opening. It can be seen that the method/system opens the valve at four isolated points in time when it has detected sudden drops in dP (=P2−P3). Three times due to "small" window actions and one time due to "large" window action as indicated by respective arrows in FIG. 9. In this case, the size of the "small" window is about 7.5 minutes, whereas the "large" window is about 25 minutes. Although the "small"- and "large" window actions are inhibited for a non-zero period of time after such actions have taken place, it can be observed that the accompanying automatic feedback control of the inlet pressure, P1, is continuously manipulating the choke. Also, "small"- and "large" window actions are inhibited whenever dP is above BALim1_DP to avoid possible large disturbances to downstream equipment. Events like "System Stabilized Detected" and "Steady State Detected" which influence the way the algorithm behaves is also indicated. The result is that the pipeline is stabilized.

It should further be noted that the inventive control method/system comprises a highly nonlinear component as opposed to a standard linear PID controller. Another difference between conventional automatic feedback controllers and the inventive method/system is that the inventive method/system typically increases the valve opening abruptly at isolated points in time as opposed to a continuous (in time) manipulation of the valve in both directions.

The method according to the present invention may be implemented as software, hardware, or a combination thereof. A computer program product implementing the method or a part thereof comprises a software or a computer program run on a general purpose or specially adapted computer, processor or microprocessor. The software includes computer program code elements or software code portions that make the computer perform the method using at least one of the steps according to the inventive method.

The program may be stored in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, or on a data server.

It will be understood by those skilled in the art that various modifications and changes may be made to the present invention without departure from the scope thereof, which is defined by the appended claims.

The invention claimed is:

1. A method for automatically controlling a multiphase flow in a flow line system, said flow line system comprising a flow line, a flow line inlet and flow line outlet, and a control valve or choke located in the flow line at the flow line outlet, the method comprising:

controlling opening of the control valve or choke in a nonlinear manner with a control unit, measuring or estimating the opening of the control valve or choke and at least one parameter at the flow line outlet selected from the group consisting of an outlet flow rate, a pressure upstream of the control valve or choke, a pressure difference across the control valve or choke, a fluid density upstream of the control valve or choke, a fluid temperature upstream of the control valve or choke, and any combination thereof, the opening of the control valve or choke being directly measured or estimated to be used in controlling the control valve or choke to minimize disturbances in the multiphase flow, determining if a sudden drop occurs in one or more of said measurements or estimates only, measuring or estimating a trend value of the outlet flow rate or the pressure upstream of the control valve or choke, or the pressure difference across the control valve or choke, or the fluid density, or the fluid temperature, or any combination thereof, and the opening of the control valve or choke in a first window moving with time, measuring or estimating a trend value of the outlet flow rate or the pressure upstream of the control valve or choke, or the pressure difference across the control valve or choke, or the fluid density, or the fluid temperature, or any combination thereof, and the opening of the control valve or choke in a second window moving with time, and if said trend value measured or estimated in the first window falls below a defined percentage of the trend value measured or estimated in the second window deciding if a liquid blockage in the flow line is present or approaching based on said measurements or estimates, and if a liquid blockage is indicated as present or approaching, adjusting intermittently, via the control unit, the control valve or choke by increasing the opening of the control valve or choke abruptly by an amount determined by said measurements or estimates, inhibiting, via the control unit, any further manipulation of the control valve or choke before a non-zero time period has expired, and thereby waiting the non-zero time period during which the control unit is controlling flow in the flow line system before manipulating the opening of the control valve or choke again, and repeating the steps according to the above.

2. The method according to claim 1, further comprising:
measuring or estimating a flow rate or a pressure, or a fluid temperature at the inlet of the flow line,
determining a mass balance of the flow line system, and
deciding if said liquid blockage is present or approaching based on said mass balance.

3. The method according to claim 1, further comprising:
measuring a pressure differential across the control valve or choke, and if said pressure differential exceeds a predetermined or automatically computed value,
inhibiting manipulation of the control valve or choke.

4. The method according to claim 1, further comprising:
measuring said outlet flow rate with a multiphase flow meter.

5. The method according to claim 1, further comprising:
estimating said outlet flow rate from measurements of a pressure differential across the control valve or choke.

6. The method according to claim 1, further comprising:
estimating said outlet flow rate from measurements of a pressure differential across the control valve or choke and measurements of valve or choke opening and/or density of the fluid flowing in the flow line.

7. The method according to claim 1, further comprising:
controlling the control valve or choke only when a predefined time period has expired since last opening step.

8. A system for automatically controlling a multiphase flow in a flow line system, said flow line system comprising a flow line inlet and flow line outlet, and a control valve or choke located in the flow line at the flow line outlet, the system comprising:

a control unit controlling opening of the control valve or choke in a nonlinear manner, means for measuring or estimating the opening of the control valve or choke and at least one parameter at the flow line outlet selected from the group consisting of an outlet flow rate a pressure upstream of the control valve or choke, a pressure difference across the control valve or choke, a fluid density upstream of the control valve or choke, a fluid temperature upstream of the control valve or choke, and any combination thereof, the opening of the control valve or choke being directly measured or estimated to be used in controlling the control valve or choke to minimize disturbances in the multiphase flow, means for determining if a sudden drop occurs in one or more of said measurements or estimates only, measuring or estimating a trend value of the outlet flow rate or the pressure upstream of the control valve or choke, or the pressure difference across the control valve or choke, or the fluid density, or the fluid temperature, or any combination thereof, and the opening of the control valve or choke in a first window moving with time, measuring or estimating a trend value of the outlet flow rate or the pressure upstream of the control valve or choke, or the pressure difference across the control valve or choke, or the fluid density, or the fluid temperature, or any combination thereof, and the opening of the control valve or choke in a second window moving with time, and if said trend value measured or estimated in the first window falls below a defined percentage of the trend value measured or estimated in the second window means for deciding if a liquid blockage in the flow line is present or approaching based on said measurements or estimates, and if a liquid blockage is indicated as present or approaching, the control unit adjusting intermittently the control valve or choke by, means for abruptly increasing the opening of the control valve or choke by an amount determined by said measurements or estimates, and means for inhibiting, via the control unit, any further manipulation of the control valve or choke before a non-zero time period has expired, and thereby waiting the non-zero time period during which the control unit is controlling flow in the flow line system before manipulating the opening of the control valve or choke again.

9. The system according to claim 8, further comprising:
means to enable the control unit to control the control valve or choke only when a predefined time period has expired since last opening step.

* * * * *